United States Patent
Ueno et al.

(10) Patent No.: US 11,420,759 B2
(45) Date of Patent: Aug. 23, 2022

(54) SUPERSONIC AIRCRAFT AND METHOD OF REDUCING SONIC BOOMS

(71) Applicant: JAPAN AEROSPACE EXPLORATION AGENCY, Tokyo (JP)

(72) Inventors: Atsushi Ueno, Tokyo (JP); Tatsunori Yuhara, Tokyo (JP); Masashi Kanamori, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 8 days.

(21) Appl. No.: 17/044,178

(22) PCT Filed: Mar. 25, 2019

(86) PCT No.: PCT/JP2019/012464
§ 371 (c)(1),
(2) Date: Sep. 30, 2020

(87) PCT Pub. No.: WO2019/194002
PCT Pub. Date: Oct. 10, 2019

(65) Prior Publication Data
US 2021/0031935 A1 Feb. 4, 2021

(30) Foreign Application Priority Data
Apr. 6, 2018 (JP) .............................. JP2018-073784

(51) Int. Cl.
*F02K 1/34* (2006.01)
*B64C 5/02* (2006.01)
(Continued)

(52) U.S. Cl.
CPC ................ *B64D 33/06* (2013.01); *B64C 5/02* (2013.01); *B64C 30/00* (2013.01); *B64D 27/20* (2013.01); *B64D 29/04* (2013.01)

(58) Field of Classification Search
CPC ........ B64D 33/06; B64D 27/20; B64D 29/04; B64D 33/04; B64C 5/02; B64C 30/00; B64C 5/06
See application file for complete search history.

(56) References Cited

U.S. PATENT DOCUMENTS 3,936,017 A * 2/1976 Blythe ................... B64D 33/06
244/110 B
6,575,406 B2 6/2003 Nelson
(Continued)

FOREIGN PATENT DOCUMENTS

EP 2 517 955 A2 10/2012
JP 2004-526619 A 9/2004
(Continued)

OTHER PUBLICATIONS

International Search Report in International Application No. PCT/JP2019/012464, filed Mar. 25, 2019.
(Continued)

*Primary Examiner* — Richard R. Green
*Assistant Examiner* — William L Gmoser
(74) *Attorney, Agent, or Firm* — Saliwanchik, Lloyd & Eisenschenk

(57) ABSTRACT

[Object] To provide a supersonic aircraft and a method of reducing sonic booms, by which sonic booms due to engine exhaust can be reduced.
[Solving Means] A supersonic aircraft includes: a pair of engine nacelles 12R, 12L mounted on a fuselage 11 of an airframe 10; fins 13R, 13L as a pair of shielding plates that inhibits engine exhaust 15 discharged from jet engines (not shown) accommodated in the engine nacelles 12R, 12L from wrapping downward around the airframe 10; and a pair of horizontal tails 14R, 14L disposed behind the engine
(Continued)

nacelles 12R, 12L. The fins 13R, 13L are disposed on the horizontal tails 14R, 14L so as to sandwich the engine exhaust 15, respectively.

2 Claims, 12 Drawing Sheets

(51) Int. Cl.
  *B64C 30/00* (2006.01)
  *B64D 27/20* (2006.01)
  *B64D 29/04* (2006.01)

(56) References Cited

U.S. PATENT DOCUMENTS

| | | | |
|---|---|---|---|
| 8,016,233 B2 * | 9/2011 | Moore | B64C 39/12 244/119 |
| 2002/0096598 A1 | 7/2002 | Nelson | |
| 2004/0016845 A1 | 1/2004 | Nelson | |
| 2004/0056150 A1 * | 3/2004 | Morgenstern | B64C 30/00 244/45 R |
| 2006/0157613 A1 | 7/2006 | Adamson et al. | |
| 2006/0237580 A1 * | 10/2006 | Cuccias | B64C 9/32 244/1 N |
| 2008/0142641 A1 | 6/2008 | Moore et al. | |
| 2012/0091270 A1 | 4/2012 | Moore et al. | |
| 2015/0108269 A1 | 4/2015 | Lugg | |
| 2018/0222568 A1 * | 8/2018 | Jordan | B64D 33/04 |

FOREIGN PATENT DOCUMENTS

| | | |
|---|---|---|
| JP | 5057374 B2 | 10/2012 |
| WO | 2016/203015 A1 | 12/2016 |

OTHER PUBLICATIONS

Darden, C. M., "Sonic-Boom Minimization With Nose-Bluntness Relaxation," *NASA Technical Paper 1348*, Jan. 1979, pp. 1-58, National Aeronautics and Space Administration.

Magee, T. E. et al., "System-Level Experimental Validations for Supersonic Commercial Transport Aircraft Entering Service in the 2018-2020 Time Period," *NASA STI Program*, Feb. 2013, pp. 1-192, National Aeronautics and Space Administration.

Morgenstern, J. et al., "Advanced Concept Studies for Supersonic Commercial Transports Entering Service in the 2018 to 2020 Period," *NASA STI Program*, Feb. 2013, pp. 1-308, National Aeronautics and Space Administration.

Alauzet, F., et al., "High-order sonic boom modeling based on adaptive methods," Journal of Computational Physics, 2010, 229:561-593, 2009 Elsevier Inc.

Karnozov, V., "TsAGI Plans ICAO Chapter 14-compliant SSBJ," Business Aviation, Jul. 25, 2017, pp. 1-2.

Supplementary European Search Report dated Nov. 10, 2021 in European Application No. 19780993.2.

Office Action dated Mar. 1, 2022 in Japanese Application No. 2018-073784.

* cited by examiner $\beta \times r = \text{sqrt}(\text{Mach}^2 - 1) \times r = \text{sqrt}(1.6^2 - 1) \times 0.3 = 0.375$ A-A cross-section

SUPERSONIC AIRCRAFT AND METHOD OF REDUCING SONIC BOOMS

CROSS-REFERENCE TO RELATED APPLICATIONS

This application is the U.S. national stage application of International Patent Application No. PCT/JP2019/012464, filed Mar. 25, 2019, which claims the benefit under 35 U.S.C. § 119 of Japanese Application No. 2018-073784, filed Apr. 6, 2018, the disclosures of each of which are incorporated herein by reference in their entirety.

TECHNICAL FIELD

The present invention relates to a supersonic aircraft such as a supersonic passenger aircraft and a method of reducing sonic booms in such a supersonic aircraft.

BACKGROUND ART

When an aircraft flies supersonically in the sky above, shock waves generated from the respective parts of the airframe integrate as they propagate long distances in the atmosphere, and are observed over land as N-type pressure waveforms that cause two abrupt pressure fluctuations, which are audible to humans as instantaneous explosive sounds. It is generally called "sonic boom". Concorde, retired in 2003, had not been permitted to fly over land at supersonic speed due to the sonic boom and its flights had been restricted only to flights over water, and the sonic boom is an important technical problem for realizing future supersonic passenger aircraft.

Technologies to reduce sonic booms by the airframe shape design have been proposed. Non-Patent Literature 1 has disclosed a technology of calculating an airframe equivalent cross-sectional area distribution (total cross-sectional area equivalent to cross-sectional area and lift of the airframe) for reducing sonic booms for aircraft design conditions (airframe length, airframe weight, flight Mach number, flight altitude, and the like). In Non-Patent Literature 2 and Non-Patent Literature 3, a specific airframe shape is designed by using the technology of Non-Patent Literature 1. Moreover, the sonic-boom reduction airframe shape concept proposed by Patent Document 1 has been applied to experimental aircraft and the flight demonstration has been performed.

CITATION LIST

Patent Literature

Patent Literature 1: Japanese Patent No. 5057374

Non-Patent Literature

Non-Patent Literature 1: Christine M. Darden: Sonic-Boom Minimization With Nose-Bluntness Relaxation, NASA TP-1348, 1979.
Non-Patent Literature 2: Todd E. Magee, Peter A. Wilcox, Spencer R. Fugal, and Kurt E. Acheson, Eric E. Adamson, Alicia L. Bidwell, Stephen G. Shaw: System-Level Experimental Validations for Supersonic Commercial Transport Aircraft Entering Service in the 2018-2020 Time Period Phase I Final Report, NASA/CR-2013-217797, 2013.
Non-Patent Literature 3: John Morgenstern, Nicole Norstrud, Jack Sokhey, Steve Martens, and Juan J. Alonso: Advanced Concept Studies for Supersonic Commercial Transports Entering Service in the 2018 to 2020 Period Phase IFinal Report, NASA/CR-2013-217820, 2013.

DISCLOSURE OF INVENTION

Technical Problem

Patent Literature 1 and Non-Patent Literatures 1 to 3 all have disclosed technologies for reducing sonic booms by the airframe shape design, but in order to apply them to actual aircraft, it is necessary to also consider the influence of engine exhaust on sonic booms.

In view of the above-mentioned circumstances, it is an object of the present invention to provide a supersonic aircraft and a method of reducing sonic booms, by which sonic booms due to engine exhaust can be reduced.

Solution to Problem

In order to accomplish the above-mentioned object, a supersonic aircraft according to an embodiment of the present invention includes: an engine nacelle mounted on a fuselage of an airframe; and a pair of shielding plates that is disposed on the airframe so as to sandwich engine exhaust discharged from a jet engine accommodated in the engine nacelle and inhibits the engine exhaust from wrapping downward around the airframe.

In accordance with the present invention, since the pair of shielding plates inhibit the engine exhaust from wrapping downward around the airframe, sonic booms due to the engine exhaust can be reduced.

The supersonic aircraft according to the embodiment of the present invention may further include a horizontal tail disposed behind the engine nacelle, in which the pair of shielding plates may be disposed on the horizontal tail.

The pair of shielding plates may be each inclined outward from the airframe.

With this configuration, pressure shielding by the shielding plate can be effectively performed and sonic booms can be reduced.

The pair of shielding plates may be each inclined at an angle that is determined by using a third-order pole in a multipole method as an index.

With this configuration, pressure shielding by the shielding plate can be effectively performed and sonic booms can be reduced.

The pair of shielding plates may each include a camber inside the airframe.

The pair of shielding plates not only reduce the negative pressure but also positively generate the positive pressure to thereby reduce sonic booms. When the shielding plates include the cambers inside, this positive pressure can be increased and the effect of reducing sonic booms by the shielding plates can be enhanced.

The pair of shielding plates may be opposite to each other with an opposing distance that is longer in a direction from a front to a rear of the airframe.

The positive pressure can be enhanced by the pair of shielding plates with this configuration and the effect of reducing sonic booms by the shielding plates can be enhanced.

The supersonic aircraft according to the embodiment of the present invention may further include an aft fuselage lifting surface provided behind the engine nacelle, in which the pair of shielding plates is disposed on the aft fuselage lifting surface and has a function as a V tail.

The pair of shielding plates may each draw inverted Mach cones from positions at which sonic booms are capable of being reduced by providing the pair of shielding plates and may be disposed at positions based on the inverted Mach cone.

With this configuration, sonic booms can be reduced a most effective position.

A method of reducing sonic booms according to an embodiment of the present invention is a method of reducing sonic booms of a supersonic aircraft with an engine nacelle mounted on a fuselage of an airframe, the method including: disposing a pair of shielding plates on the airframe so as to sandwich engine exhaust discharged from a jet engine accommodated in the engine nacelle; and inhibiting the engine exhaust from wrapping downward around the airframe by the pair of shielding plates.

The method of reducing sonic booms according to the embodiment of the present invention may further include drawing inverted Mach cones from positions at which pressure is to be increased by disposing the pair of shielding plates and disposing the pair of shielding plates at positions based on the inverted Mach cones. Typically, the method of reducing sonic booms according to the embodiment of the present invention may further include: setting a first position on a plane of symmetry that crosses perpendicularly to a center of the airframe, the first position being the position at which the pressure is to be increased by disposing the pair of shielding plates and a second position and a third position shifted by a predetermined angle in first and second directions of a circumferential direction around the fuselage of the airframe from the first position, the second position and the third position being each the position at which the pressure is to be increased by disposing the pair of shielding plates; drawing first to third inverted Mach cones from the first to third positions, respectively; positioning a rear end of a shielding plate of the pair of shielding plates, which is located on a side of the second direction, at a point on a parabola at which the first inverted Mach cone and the second inverted Mach cone intersect; and positioning a rear end of a shielding plate of the pair of shielding plates, which is located on a side of the first direction, at a point on the parabola at which the first inverted Mach cone and the third inverted Mach cone intersect.

The method of reducing sonic booms according to the embodiment of the present invention may further include defining an angle at which each of the pair of shielding plates is inclined outward from the airframe by using the third-order pole in the multipole method as the index. Typically, the method of reducing sonic booms according to the embodiment of the present invention may further include defining an angle at which each of the pair of shielding plates is inclined outward from the airframe by using a difference between a correction amount of a pressure distribution according to the multipole method immediately below the airframe in a case where the pair of shielding plates is provided and a correction amount of a pressure distribution according to the multipole method immediately below the airframe in a case where the pair of shielding plates is not provided or a difference between a third-order pole distribution in a case where the pair of shielding plates is provided and a third-order pole distribution in a case where the pair of shielding plates is not provided as an index.

Advantageous Effects of Invention

According to the present invention, sonic booms due to engine exhaust can be reduced.

MODE(S) FOR CARRYING OUT THE INVENTION

Hereinafter, an embodiment of the present invention will be described with reference to the drawings.

First Embodiment (Configuration of Supersonic Aircraft)

Figure 1:
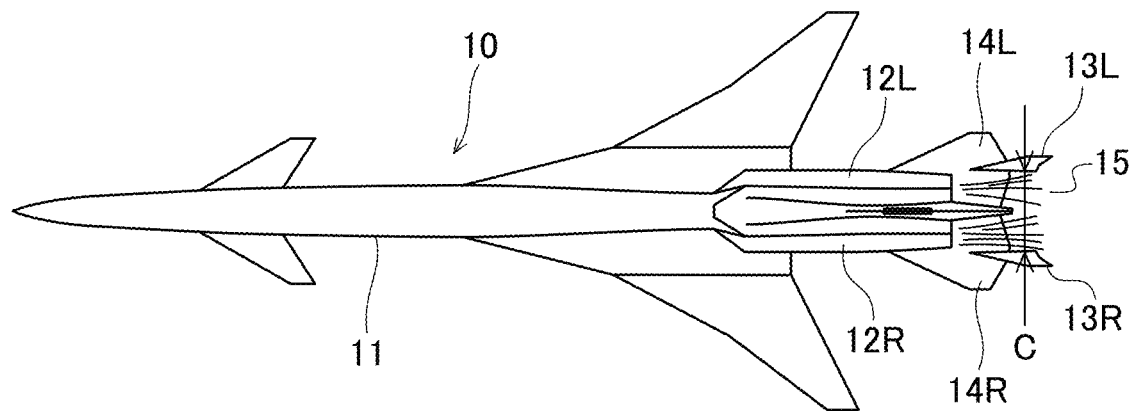
FIG. 1 A plan view showing the outer appearance of a supersonic aircraft according to an embodiment of the present invention.
Figure 2:
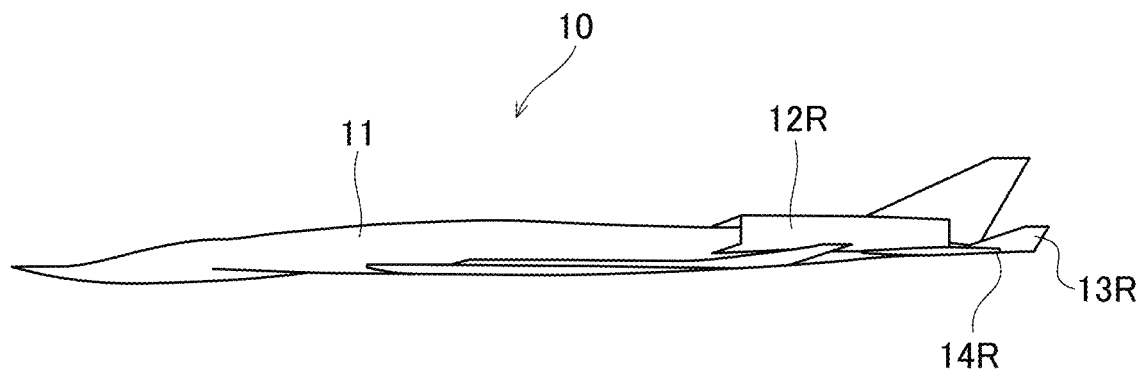
FIG. 2 A side view showing the outer appearance of the supersonic aircraft shown in FIG. 1.

FIG. 1 is a plan view showing the outer appearance of a supersonic aircraft according to the embodiment of the present invention. FIG. 2 is a side view thereof and FIG. 3 is a front view thereof.

Figure 3:
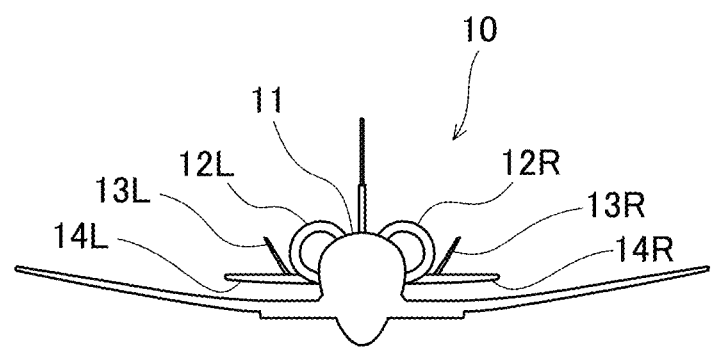
FIG. 3 A front view showing the outer appearance of the supersonic aircraft shown in FIG. 1.

As shown in FIGS. 1 to 3, the supersonic aircraft according to this embodiment includes a pair of engine nacelles 12R, 12L mounted on a fuselage 11 of an airframe 10, fins 13R, 13L as a pair of shielding plates that inhibits engine exhaust 15 discharged from jet engines (not shown) accommodated in the engine nacelles 12R, 12L from wrapping downward around the airframe 10, and a pair of horizontal tails 14R, 14L disposed behind the engine nacelles 12R, 12L.

The fins 13R, 13L are typically disposed on the horizontal tails 14R, 14L of the airframe 10 so as to sandwich the engine exhaust 15, respectively.

More specifically, the pair of fins 13R, 13L and the pair of horizontal tails 14R, 14L are respectively arranged in plane symmetry with respect to a plane of symmetry 16 that crosses perpendicularly to the axis of the airframe 10. The fin 13R is mounted on the horizontal tail 14R and the fin 13L is mounted on the horizontal tail 14L.

Figure 4:
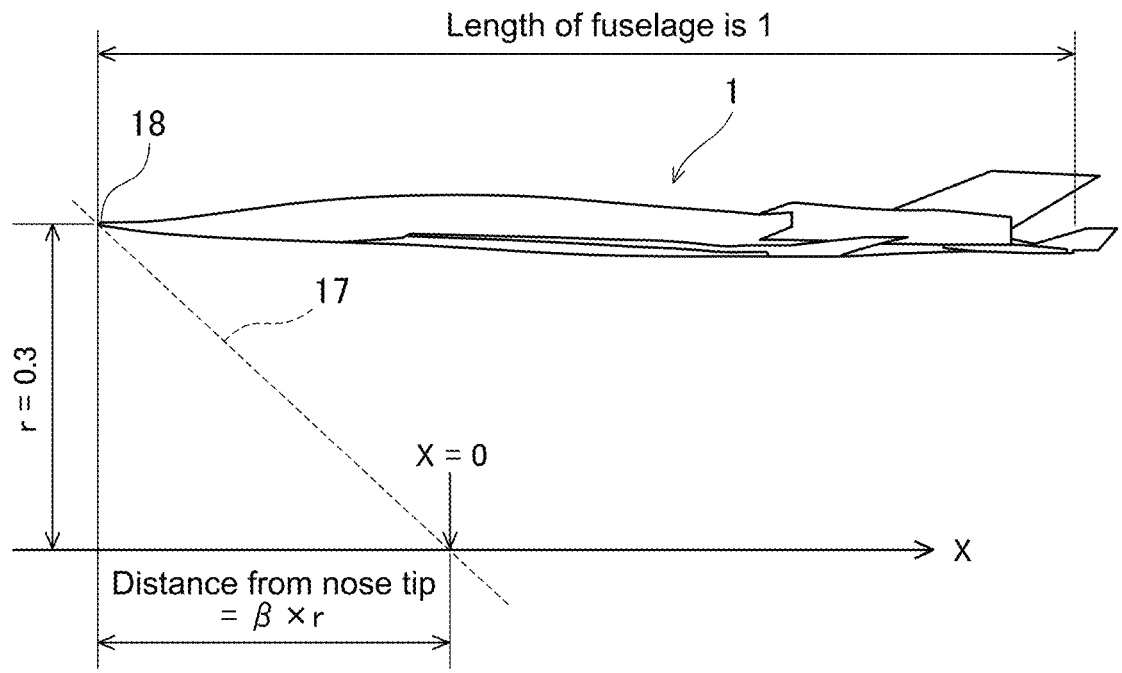
FIG. 4 A diagram showing a definition of a coordinate axis, which is required for describing the embodiment of the present invention.

FIG. 4 is a diagram showing a definition of coordinate axes required for describing this embodiment.

In this embodiment, the length of the fuselage 11 is 1. The origin (X=0) of the coordinate axis X is an intersection of a Mach line 17 generated from a nose tip 18 and the X-axis which is separated downward from the airframe by r, that is, a position which is shifted backward by a distance from the nose tip $18=\beta \times r$.

Here, r=0.3 is set in consideration of design efficiency. It is because as the value of r becomes larger, the analysis time becomes longer and more efficient design is impossible.

Moreover, the Mach number was set to 1.6 at the cruising speed of the supersonic aircraft.

For $\beta \times r$, $$\beta \times r = \text{sqrt}(\text{Mach}^2 - 1) \times r = \text{sqrt}(1.6^2 - 1) \times 0.3 = 0.375.$$

(Setting of Fin Positions)

In this embodiment, positions of the fins 13R, 13L are determined on the basis of inverted Mach cones.

Figure 5:
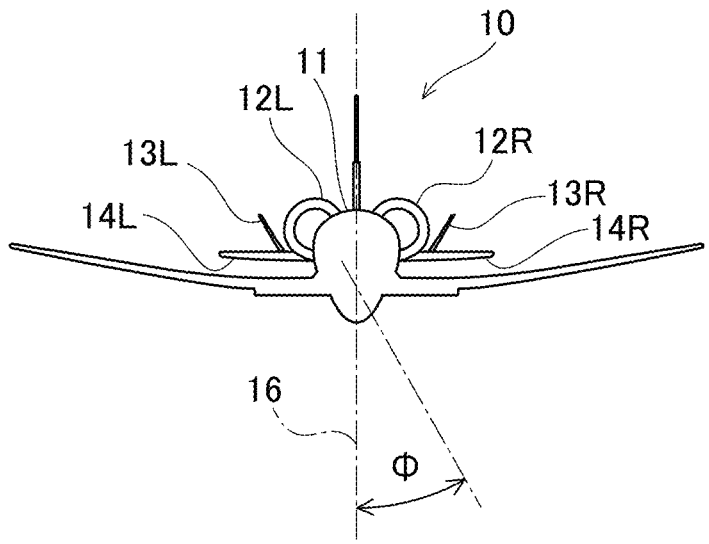
FIG. 5 A diagram showing a definition of an angle in a circumferential direction, which is required for describing the embodiment of the present invention.
Figure 6:
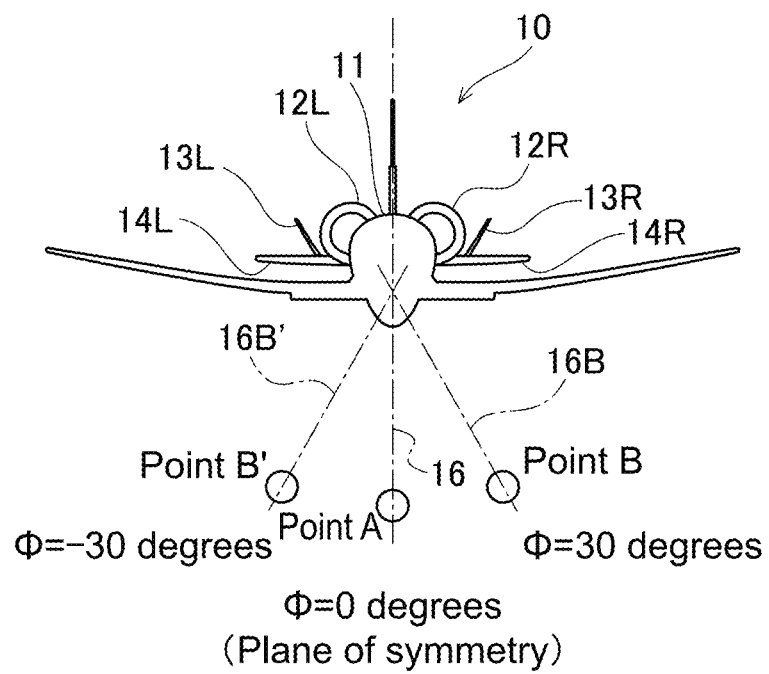
FIG. 6 A diagram showing a definition of a position shifted by a predetermined angle in the circumferential direction, which is required for describing the embodiment of the present invention.

FIG. 5 is a diagram showing a definition of an angle in a circumferential direction, which is required for describing this embodiment. Moreover, FIG. 6 is a diagram showing a definition of a point shifted by a predetermined angle in the circumferential direction, which is required for describing this embodiment. In this embodiment, as shown in FIG. 5, a lower side of the plane of symmetry 16 that crosses perpendicularly to the axis of the airframe 10 is set as an angle $\phi=0$ degrees in the circumferential direction (this surface will be referred to as plane of symmetry), and then the counter-clockwise direction of the circumferential direction around the fuselage is set to be positive and the clockwise direction is set to be negative as viewed from the front of the airframe 1. As shown in FIG. 5, $\phi=30$ degrees refers to a plane 16B rotated by 30 degrees in the counter-clockwise direction as viewed from the front of the airframe 1. As shown in FIG. 6, a point A to be described later is included on the plane of symmetry at $\phi=0$ degrees, a point B is included in the plane 16B at $\phi=30$ degrees, and a point B' is included in the plane 16B' at $\phi=-30$ degrees.

First of all, a near field position to increase the pressure is determined from the viewpoint of sonic-boom reduction.

Figure 7:
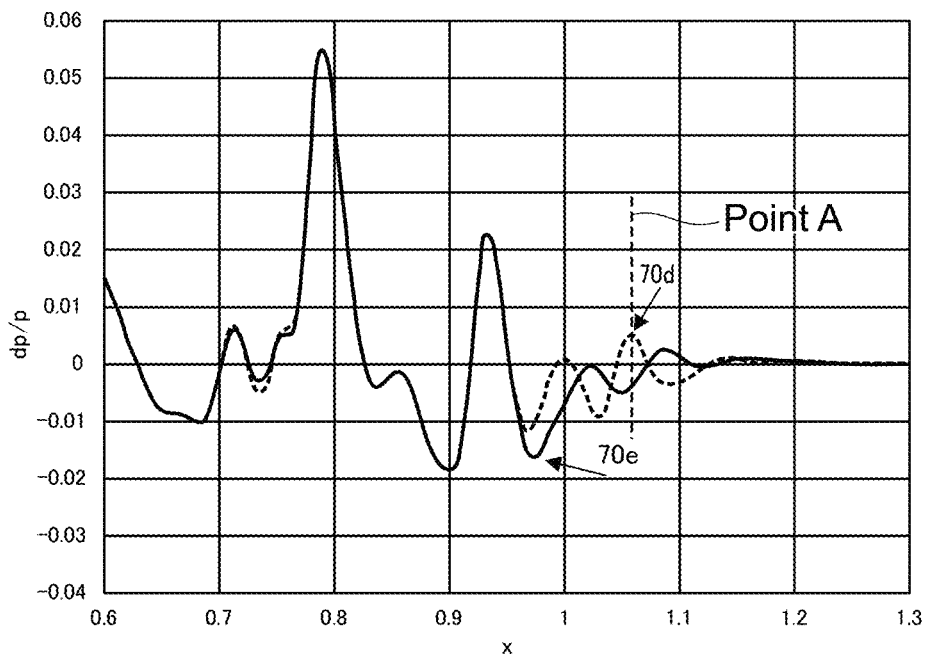
FIG. 7 A graph showing a pressure waveform on a coordinate axis at $\phi=0$ degrees for determining a start point of an inverted Mach cone when determining a position of a fin according to the embodiment of the present invention by the inverted Mach cone.
Figure 8:
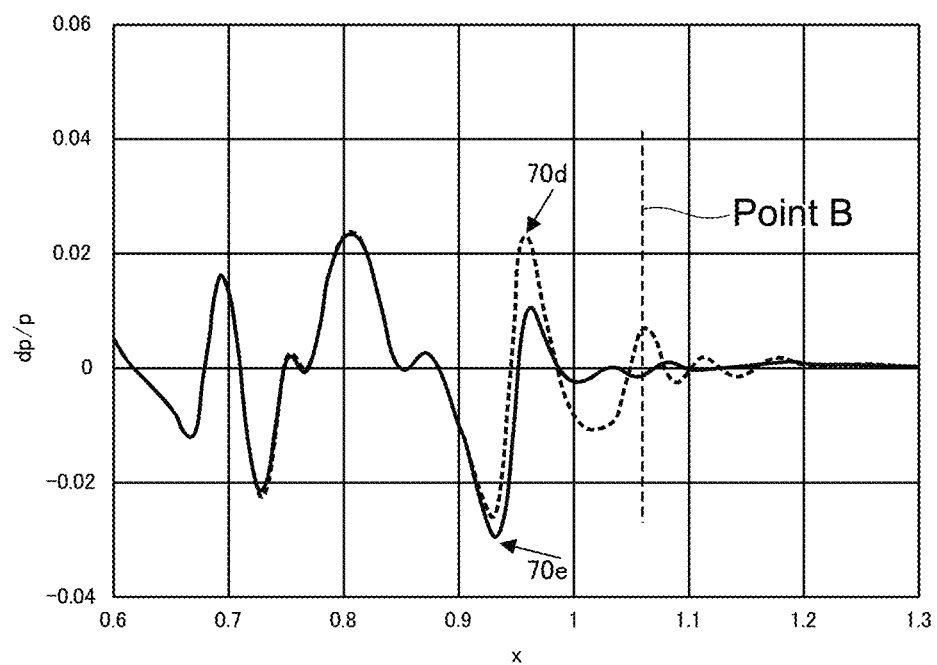
FIG. 8 A graph showing a pressure waveform on a coordinate axis at $\phi=30$ degrees for determining a start point of an inverted Mach cone when determining a position of the fin according to the embodiment of the present invention by the inverted Mach cone.

Here, in order to determine a start point of an inverted Mach cone when determining a position of the fin according to this embodiment by the inverted Mach cone, a pressure waveform on an X coordinate axis on the plane of symmetry is shown in the graph of FIG. 7 and a pressure waveform on an X coordinate axis on the plane 16B after the plane of symmetry 16 is rotated by 30 degrees is shown in the graph of FIG. 8. In FIGS. 7 and 8, a waveform 70d represents a case where the fins are provided and a waveform 70e represents a case where the fins are not provided. In FIGS. 7 and 8, p on the Y-axis is a uniform flow static pressure and dp is a difference from the uniform flow static pressure.

The point A to increase the pressure on the symmetry plane is determined from the waveforms 70d, 70e of FIG. 7 and the point B to increase the pressure on the plane 16B at $\phi=30$ degrees is determined from the waveforms 70d, 70e of FIG. 8 (Step 1).

Figure 9:
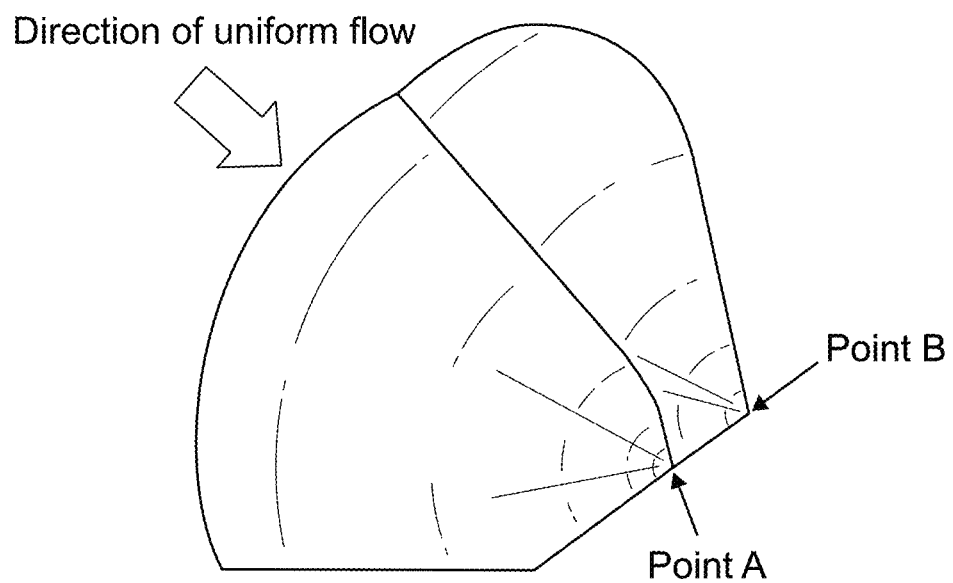
FIG. 9 A diagram showing a state in which the inverted Mach cone is drawn from each position when determining the position of the fin according to the embodiment of the present invention by the inverted Mach cone.

Next, as shown in FIG. 9, the inverted Mach cones 20A, 20B are drawn from two points of the point A and the point B, respectively, and the position of the fin 13L is set by using a point on a parabola at which these intersect as a position of a wing tip trailing edge of the fin 13L (Step 2).

Then, a viewpoint of whether the position of the fin 13L set in Step 2 is a favorable position for shielding the exhaust jet is added, in other words, the point on the parabola or the points A and B is corrected in a manner that depends on needs and Steps 1 and 2 described above are repeated (Step 3).

The viewpoint of whether the position of the fin 13L set in Step 2 is the favorable position for shielding the exhaust jet is determined on the basis of a consideration that a significant shielding effect is not provided if the position obtained from the inverted Mach cone is far above the exhaust jet, for example.

(Setting of Fin Inclination Angle)

Figure 10:
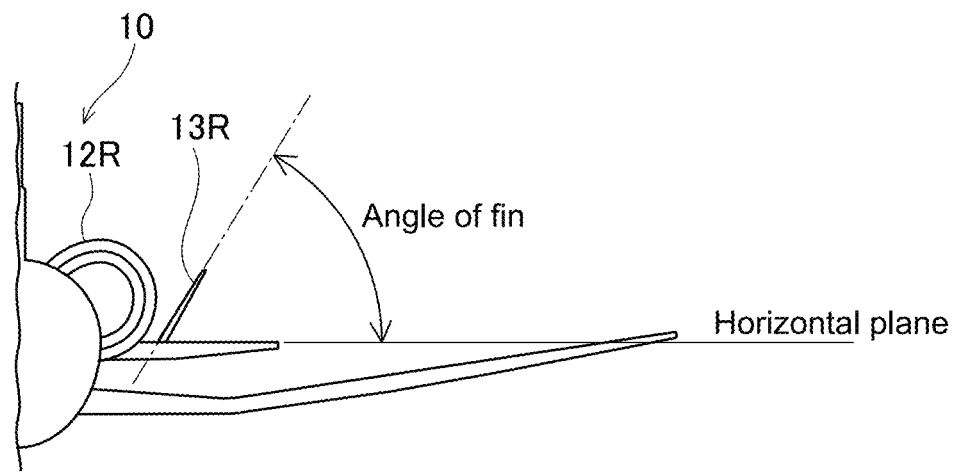
FIG. 10 A diagram showing a definition of an angle of the fin according to the embodiment of the present invention.

FIG. 10 is a diagram showing a definition of an angle of the fin according to this embodiment.

In this embodiment, as shown in FIG. 10, the pair of fins 13R, 13L is each inclined outward from the airframe. This inclination angle is defined as the angle of the fin. When the fins 13R, 13L are appropriately inclined in this manner, sonic booms can be reduced.

As shown in FIG. 4, the X-axis is separated from the airframe 1 by a distance that is 0.3 times as long as the fuselage length. The pressure waveform changes as this position moves away from the airframe 1 (see FIGS. 19 and 20 to be described later). As one of the factors of change, when the expansion wave is propagated in the circumferential direction of the airframe 10, the pressure three-dimensionally changes in the circumferential direction. Here, the pressure distribution on the X-axis is defined as a reference waveform.

In a case where this reference waveform is used in calculating a waveform of a sonic boom over land (see FIG. 16 to be described later), such a three-dimensional circumferential pressure propagation is not considered in propagation from the position of the X-axis to the ground. Therefore, in this embodiment, a multipole method is employed in order to solve this problem.

Here, a virtual pressure waveform obtained by correcting the reference waveform in consideration of the three-dimensional circumferential pressure propagation. This virtual pressure waveform is defined as a multipole waveform. More specifically, correcting the reference waveform refers to replacing the airframe with an equivalent multipole distribution and virtually adding a pressure waveform deformation due to the pressure propagation in the circumferential direction to the reference waveform while reflecting the intensity decay of the pressure propagation in the circumferential direction given for each pole order.

Then, the multipole waveform–the reference waveform is defined as a correction amount.

If this correction amount (=multipole waveform–reference waveform) is large, the influence of the three-dimensional circumferential pressure propagation is large.

In this embodiment, since the three-dimensional circumferential pressure propagation of the pressure wave generated by the engine exhaust 15 is reduced by the fins 13R, 13L, the fin inclination angle is set by using this correction amount as an index.

Figure 11:
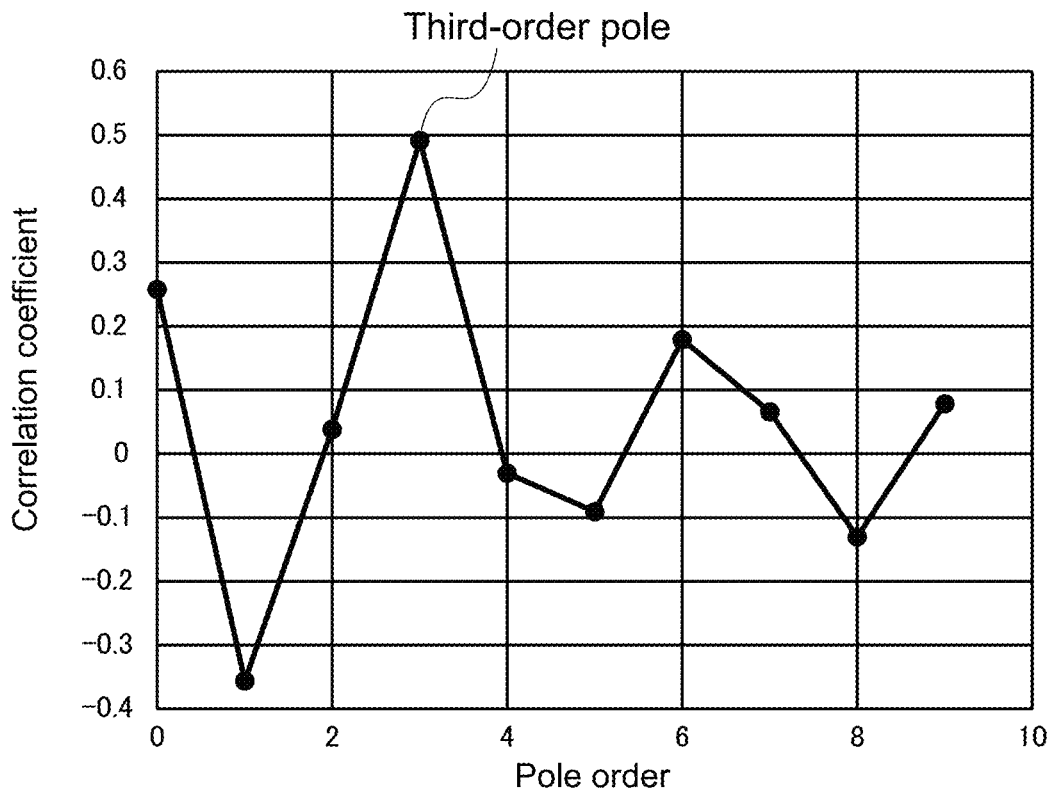
FIG. 11 A graph showing a relationship between a pole order in a multipole method and a correlation coefficient.

FIG. 11 is a graph showing a relationship between a pole order and a correlation coefficient regarding a correlation between a difference relating to the correction amount between the case where the fins are provided and the case where fins are not provided and a difference relating to the pole distribution in the multipole method between the case where the fins are provided and the case where fins are not provided. As can be seen from this figure, the correlation coefficient of the third-order pole is large. That is, the third-order pole can best express the pressure shielding by the fins 13R, 13L. Therefore, it can be said that it is effective to set the fin inclination angle by using the third-order pole distribution as an index. More specifically, this third-order pole distribution is an index representing the strength of the up-and-down asymmetry of the flow field. This third-order pole index is defined as a multipole correlation.

Figure 12:
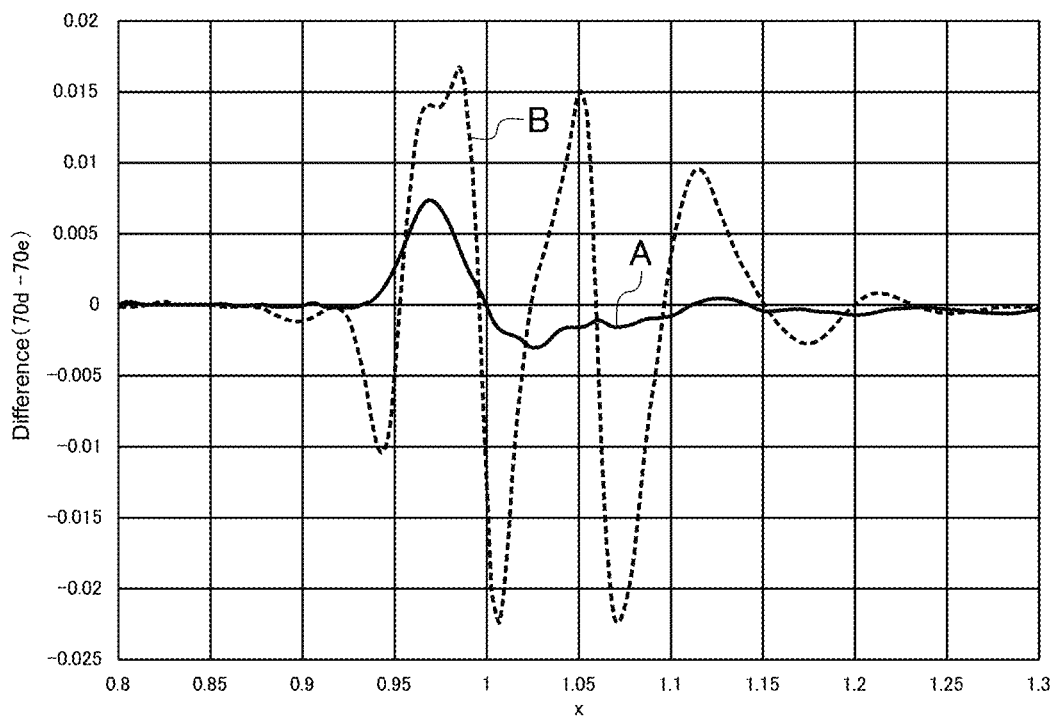
FIG. 12 A graph showing an example of a waveform (waveform A) of a difference in correction amount of a pressure distribution between a case where the fins are provided and a case where the fins are not provided and a waveform (waveform B) of a difference in third-order pole distribution in the multipole method between the case where the fins are provided and the case where the fins are not provided according to the embodiment of the present invention.

Examples of a waveform (waveform A) of the difference in correction amount between the case where the fins are provided and the case where fins are not provided and a waveform (waveform B) of the difference in multipole correlation between the case where the fins are provided and the case where fins are not provided are shown in the graph of FIG. 12.

Here, the waveform A indicates that regarding the peak between 0.95 and 1 of the difference in correction amount, the correction amount at this position is larger in the case where the fins are provided than in the case where the fins are not provided. Without the fins, the expansion wave generated by the engine exhaust three-dimensionally wraps in the circumferential direction, such that the correction amount becomes negative. With the fins, this wrapping is suppressed, such that a peak is formed because the correction amount on the negative side decreases. Since this suppression of the wrapping of the expansion wave is effective for reducing sonic booms, it is sufficient to set the fin inclination angle such that this peak is higher.

Moreover, comparing the waveform A of the difference in correction amount with the waveform B of the difference in multipole correlation, these waveforms are correlated in that a peak is formed between 0.95 and 1 on the horizontal axis. Therefore, sonic booms can be reduced even if the fin inclination angle is set such that the peak between 0.95 and 1 in the waveform of the difference in multipole correlation is higher in a manner similar to that described above.

In the present invention, the fin inclination angle may be set by using the correction amount as an index, the fin inclination angle may be set by using the multipole correlation as an index, or the fin inclination angle may be set by using both the correction amount and the multipole correlation as indices.

(Setting of Camber of Fin, Etc.)

Figure 13:
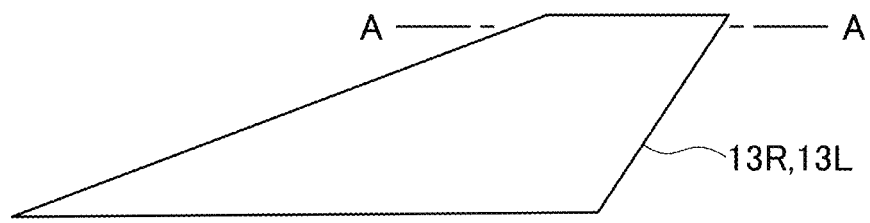
FIG. 13 A side view of the fin according to the embodiment of the present invention.
Figure 14:
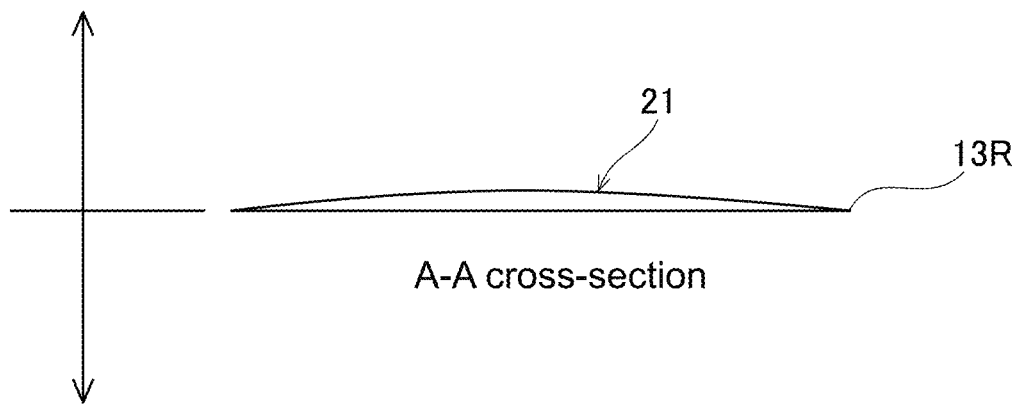
FIG. 14 A diagram showing a shape of the A-A cross-section of FIG. 13.

FIG. 13 is a side view of the fin 13R and FIG. 14 is an A-A cross-sectional view of the fin 13R shown in FIG. 13. It should be noted that the fin 13L is plane-symmetrical with the fin 13R with respect to the plane of symmetry 16.

As shown in FIG. 14, each of the fins 13R, 13L includes a camber 21 directed toward the inside of the airframe 10.

Here, lines of intersection of the Mach cones extending from the wing tip trailing edges of the fins 13R, 13L and the plane of symmetry 16 substantially coincide with the pressure distribution. Moreover, the fins 13R, 13L not only reduce the negative pressure but also positively generate the positive pressure. The cambers 21 increase this positive pressure. Therefore, since the fins 13R, 13L include the cambers 21, stronger shock is generated toward the inside of the airframe, such that the bow shock on the plane of symmetry 16 is intensified and sonic booms can be further reduced.

Moreover, as shown in FIG. 1, an opposing distance C between the fin 13R and the fin 13L is longer in a direction from the front to the rear of the airframe 10. By configuring the fins 13R, 13L in this manner, strong bow shock is generated as in the cambers and the sonic booms can be further reduced.

It should be noted that the effect of the sonic-boom reduction can be enhanced by setting the fin shapes of the fins 13R, 13L and the opposing distance C between the fins 13R, 13L by using the multipole method as in the setting of the fin inclination angle.

(Effects of Fins)

When the supersonic aircraft according to this embodiment includes the fins 13R, 13L, the influence of the engine exhaust 15 on sonic booms can be reduced.

Figure 15:
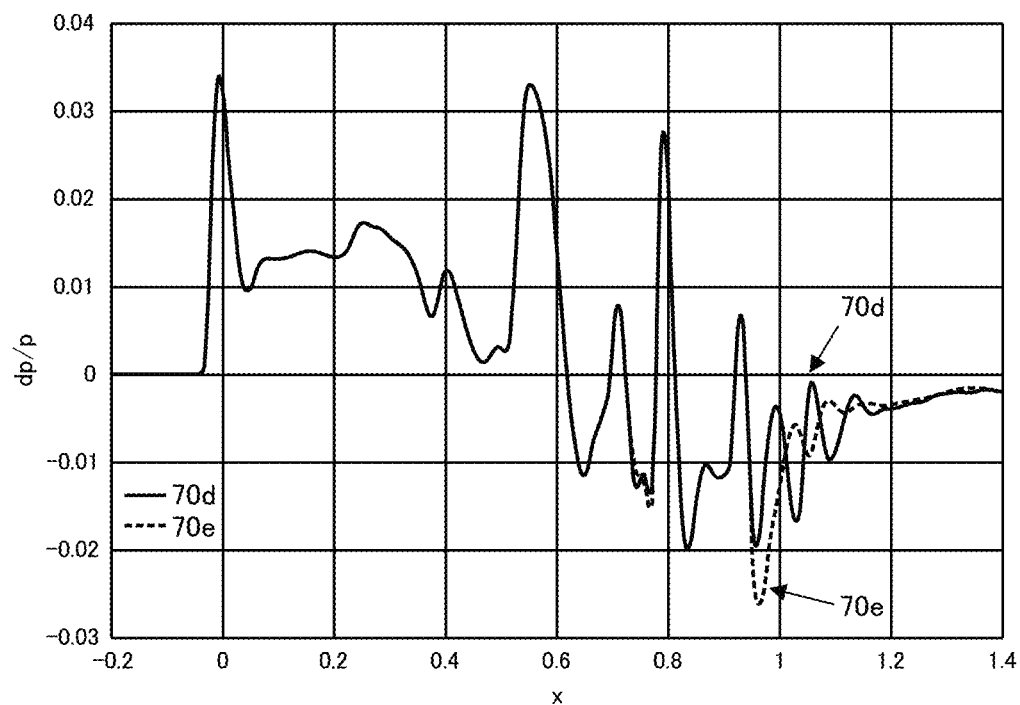
FIG. 15 A graph showing a pressure distribution in a near field immediately below an airframe in a case where the fins are provided and in a case where the fins are not provided for verifying the effects of the fins according to the embodiment of the present invention.
Figure 16:
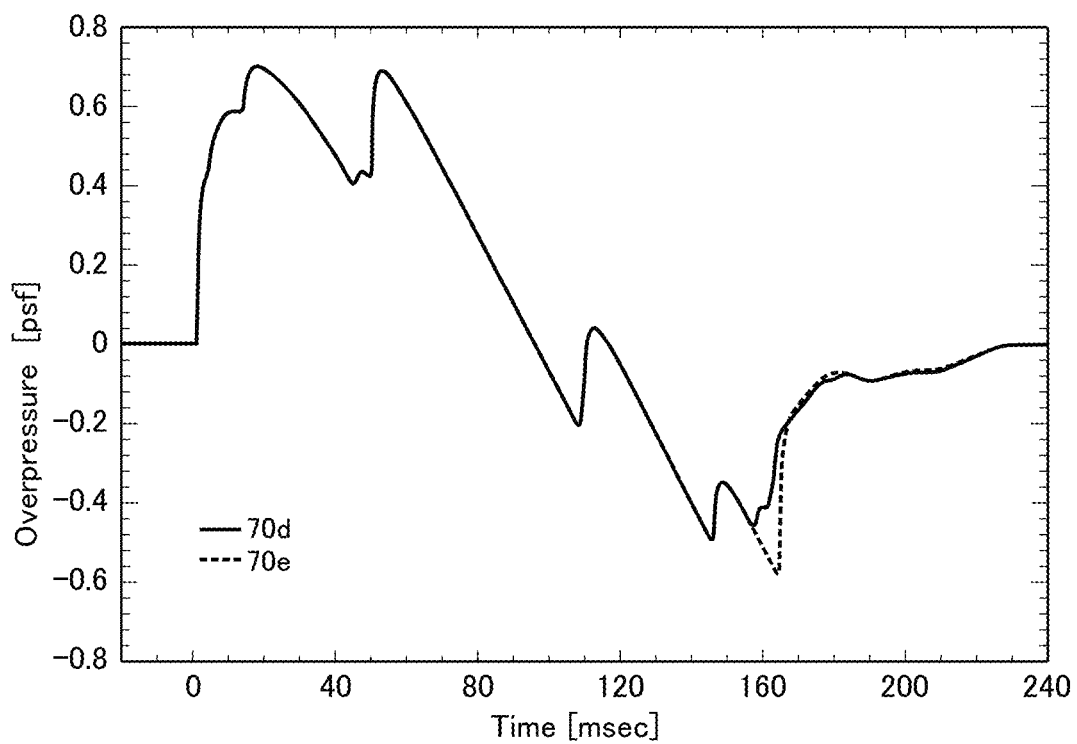
FIG. 16 A graph showing a sonic-boom waveform over land immediately below the airframe in the case where the fins are provided and in the case where the fins are not provided for verifying the effects of the fins according to the embodiment of the present invention.

Here, FIG. 15 is a graph showing a pressure waveform in a near field immediately below the airframe in a case where the fins 13R, 13L are provided (70d) and in the case where the fins 13R, 13L are not provided (70e). FIG. 16 is a graph showing a sonic-boom waveform over land immediately below the airframe in a case where the fins 13R, 13L are provided (70d) and in the case where the fins 13R, 13L are not provided (70e).

The following calculation conditions were used:
Altitude: 14.4 km
Mach number: 1.6
Angle of attack: 2.76 degrees
100% thrust.

As can be seen from FIGS. 15 and 16, the pressure more increases in both graphs in the case where the fins 13R, 13L are provided. From this, it can be understood that the influence of the engine exhaust 15 on sonic booms is reduced when the fins 13R, 13L are provided.

Figure 17:
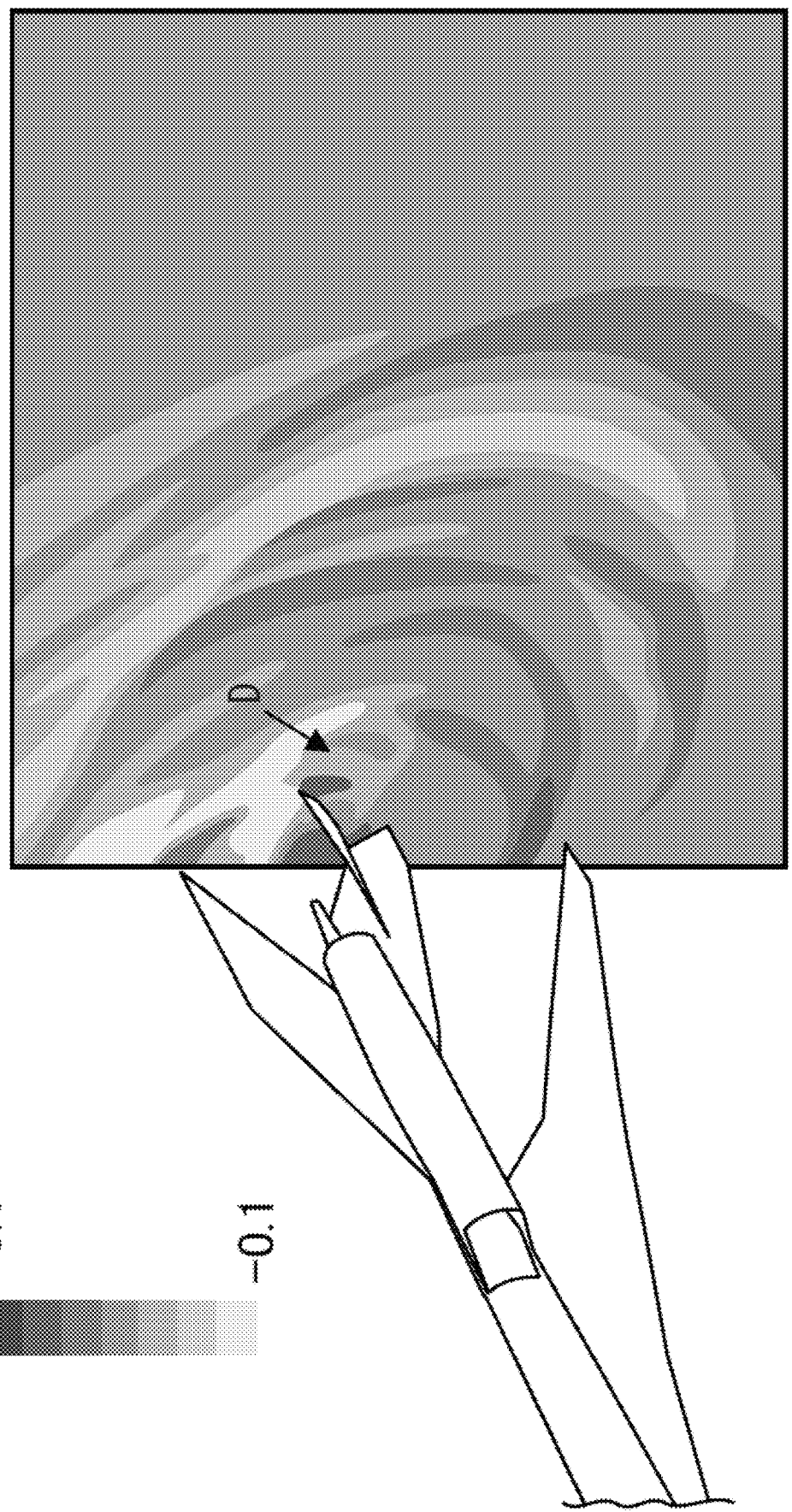
FIG. 17 A diagram showing a pressure-coefficient distribution of a cross-section orthogonal to the X-axis at a predetermined position on the X-axis according to the embodiment of the present invention.
Figure 18:
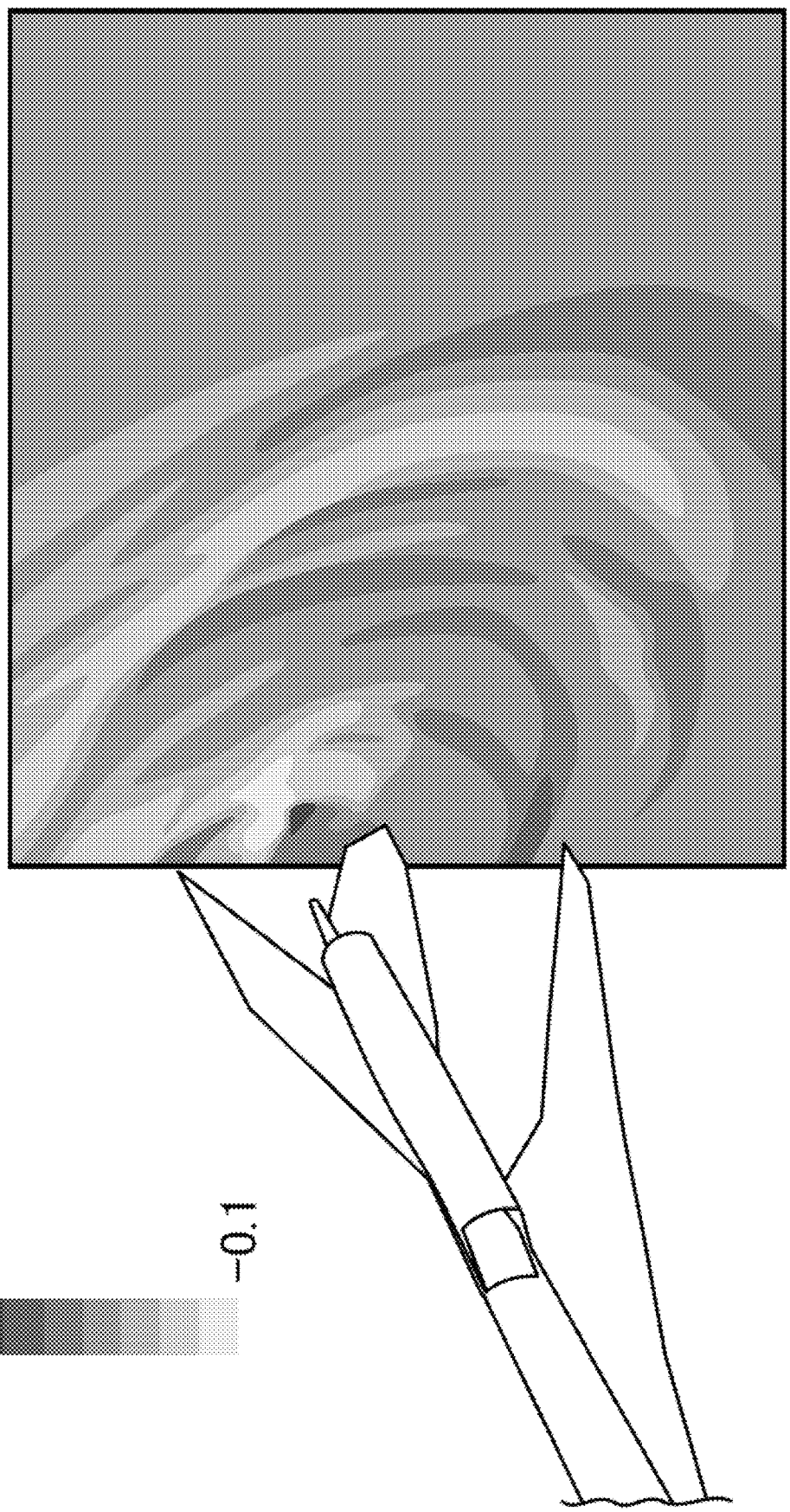
FIG. 18 A diagram showing a pressure-coefficient distribution of a cross-section orthogonal to the X-axis at a predetermined position on the X-axis in the case where the fins are not provided as a comparative example of FIG. 17.

FIGS. 17 and 18 each show a pressure-coefficient distribution on a cross-section orthogonal to the X-axis at a predetermined position (near fin position) on the X-axis. FIG. 17 shows the case where the fins 13R, 13L are provided and FIG. 18 shows the case where the fins are not provided.

Comparing a region indicated by the arrow D of FIG. 17 with the corresponding region of FIG. 18, it can be seen that the pressure coefficient is higher in a case where the fins 13R, 13L are provided, which is shown in FIG. 17, and wrapping of the expansion wave is suppressed.

Figure 19:
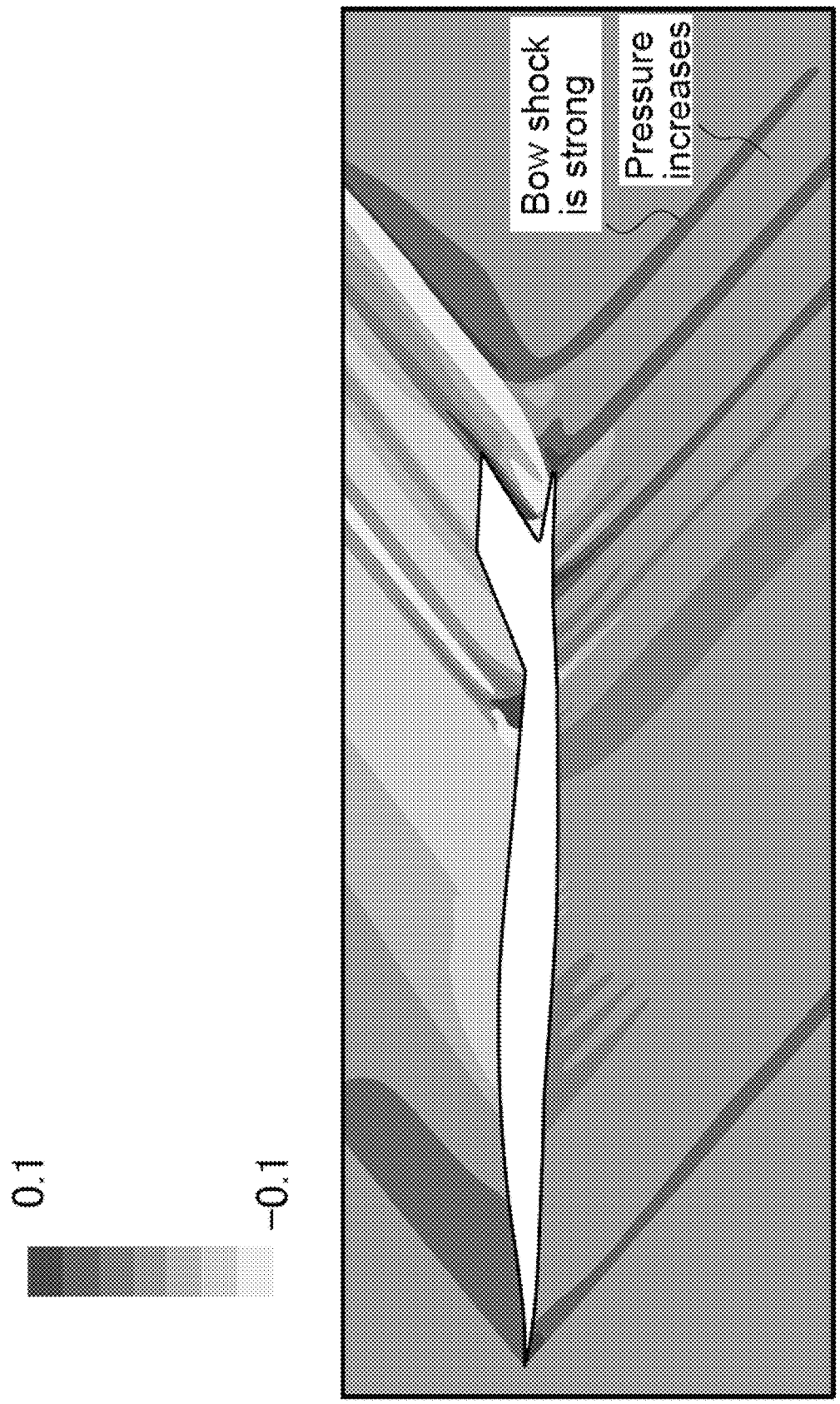
FIG. 19 A diagram showing a pressure-coefficient distribution on a plane of symmetry according to the embodiment of the present invention.
Figure 20:
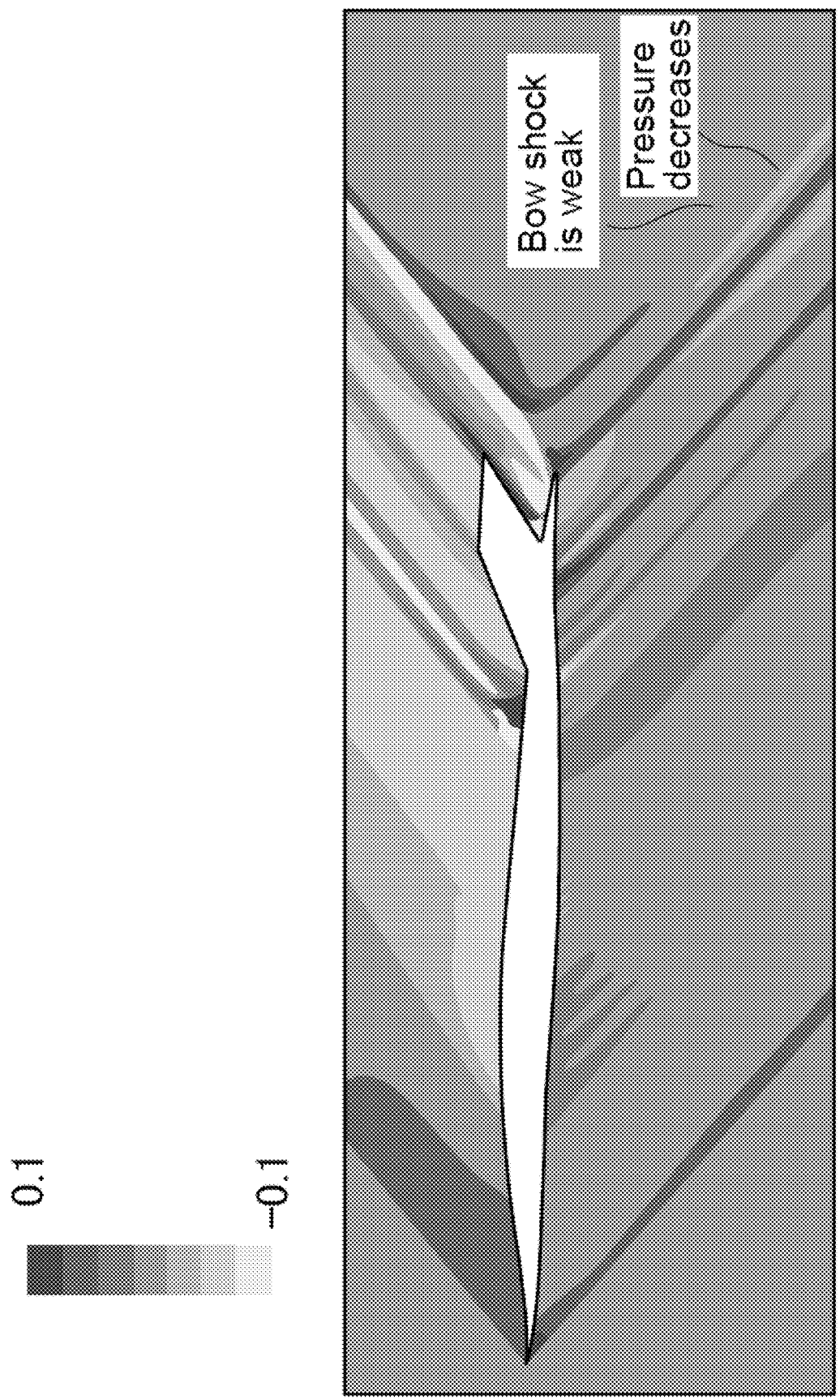
FIG. 20 A diagram showing a pressure-coefficient distribution on a plane of symmetry in the case where the fins are provided as a comparative example of FIG. 19.

Moreover, FIGS. 19 and 20 each show a pressure-coefficient distribution on the plane of symmetry 16. FIG. 19 shows the case where the fins 13R, 13L are provided and FIG. 20 shows the case where the fins 13R, 13L are not provided.

Comparing FIG. 19 with FIG. 20, it can be seen that the bow shock is stronger and the pressure increases in the case where the fins 13R, 13L are provided. It means that the effect of suppressing the wrapping of the expansion wave with the fins 13R, 13L can be confirmed also on the plane of symmetry 16.

From the above-mentioned viewpoint, it can be seen that the influence of the engine exhaust 15 on sonic booms is reduced when the fins 13R, 13L are provided.

Second Embodiment

The present invention can be provided not only in the supersonic aircraft having the configuration shown in the above-mentioned embodiment, but also in various forms of supersonic aircraft.

Figure 21:
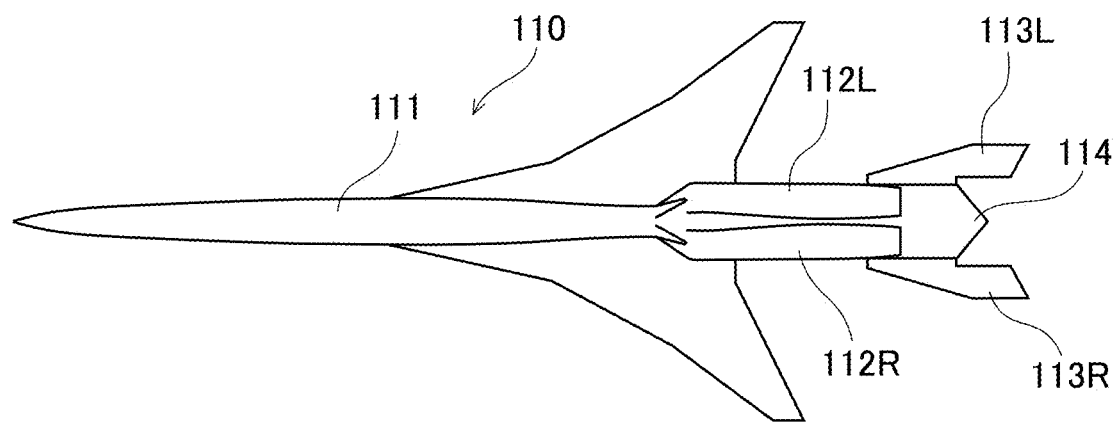
FIG. 21 A plan view showing the outer appearance of a supersonic aircraft according to another embodiment of the present invention.
Figure 22:
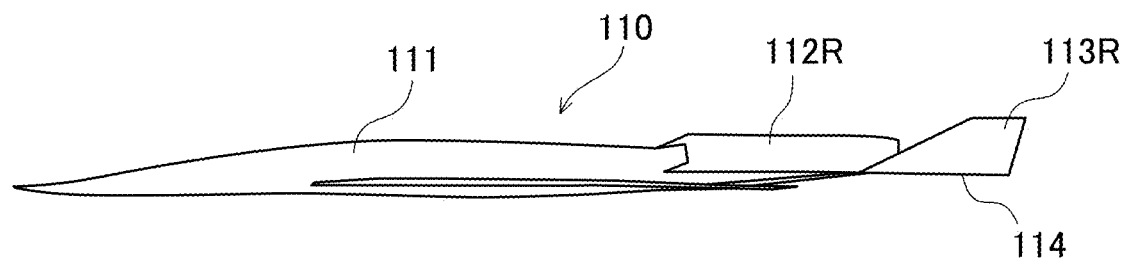
FIG. 22 A side view showing the outer appearance of the supersonic aircraft shown in FIG. 21.

FIG. 21 is a plan view showing the outer appearance of a supersonic aircraft according to a second embodiment. FIG. 22 is a side view thereof and FIG. 23 is a front view thereof.

Figure 23:
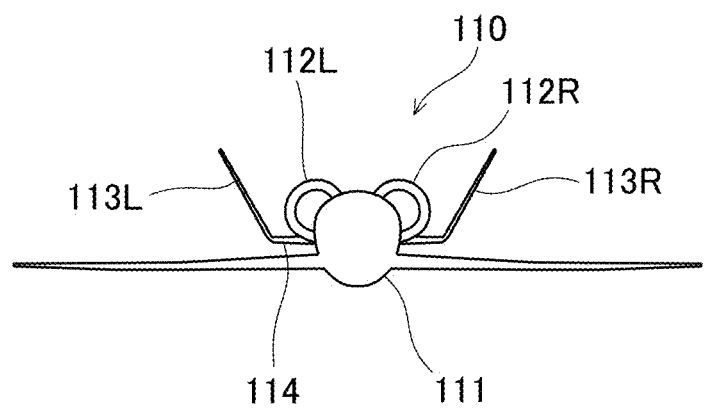
FIG. 23 A front view showing the outer appearance of the supersonic aircraft shown in FIG. 21.

As shown in FIG. 21 to FIG. 23, the supersonic aircraft according to this embodiment includes a pair of engine nacelles 112R and 112L mounted on a fuselage 111 of an airframe 110 and a pair of shielding plates 113R, 113L disposed behind the engine nacelles 112R, 112L.

The pair of shielding plates 113R, 113L is mounted on an aft fuselage lifting surface 114 provided behind the engine nacelles 112R, 112L so as to be inclined outward from the airframe.

The pair of shielding plates 113R, 113L prevents inhibits the engine exhaust 15 discharged from jet engines (not shown) accommodated in the engine nacelles 112R, 112L from wrapping around the fuselage 111 and has a function as a V tail.

Also with the supersonic aircraft according to this embodiment, sonic booms can be reduced when the pair of shielding plates 113R, 113L is provided as described in the first embodiment.

<Others>

The present invention is not limited to the above-mentioned embodiments and can be implemented as various modifications and applications without departing from the technical concept of the invention. The scope of such implementation is also encompassed in the technical scope of the present invention.

REFERENCE SIGNS LIST 1 airframe
10 airframe
11 fuselage
12L engine nacelle
12R engine nacelle
13L fin
13R fin
14L horizontal tail
14R horizontal tail
15 engine exhaust
16 plane of symmetry
16B surface
16B' surface
17 mach line
18 nose tip
20A inverted Mach cone
20B inverted Mach cone
20B' inverted Mach cone
21 camber
70*d* a waveform where fins are provided
70*e* a waveform where fins are not provided
110 airframe
111 fuselage
112L engine nacelle
112R engine nacelle
113L shielding plate
113R shielding plate
114 aft fuselage lifting surface
C opposing distance
ϕ angle

The invention claimed is:

1. A method of reducing sonic booms of a supersonic aircraft with an engine nacelle mounted on a fuselage of an airframe, the method comprising:
    disposing a pair of shielding plates on the airframe so as to sandwich engine exhaust discharged from a jet engine accommodated in the engine nacelle;
    inhibiting the engine exhaust from wrapping downward around the airframe by the pair of shielding plates;
    drawing inverted Mach cones from positions at which pressure is to be increased by disposing the pair of shielding plates and disposing the pair of shielding plates at positions based on the inverted Mach cones;
    setting a first position on a plane of symmetry that crosses perpendicularly to a center of the airframe, the first position being the position at which the pressure is to be increased by disposing the pair of shielding plates and a second position and a third position shifted by a predetermined angle in first and second directions of a circumferential direction around the fuselage of the airframe from the first position, the second position and the third position being each the position at which the pressure is to be increased by disposing the pair of shielding plates;
    drawing first to third inverted Mach cones from the first to third positions, respectively;
    positioning a rear end of a shielding plate of the pair of shielding plates, which is located on a side of the second direction, at a point on a parabola at which the first inverted Mach cone and the second inverted Mach cone intersect; and
    positioning a rear end of a shielding plate of shielding plates, which is located on a side of the first direction, at a point on the parabola at which the first inverted Mach cone and the third inverted Mach cone intersect.

2. A method of reducing sonic booms of a supersonic aircraft with an engine nacelle mounted on a fuselage of an airframe, the method comprising:

disposing a pair of shielding plates on the airframe so as to sandwich engine exhaust discharged from a jet engine accommodated in the engine nacelle; and inhibiting the engine exhaust from wrapping downward around the airframe by the pair of shielding plates;

defining an angle at which each of the pair of shielding plates is inclined outward from the airframe by using the third-order pole in the multipole method as the index; and defining an angle at which each of the pair of shielding plates is inclined outward from the airframe by using a difference between a correction amount of a pressure distribution according to the multipole method immediately below the airframe in a case where the pair of shielding plates is provided and a correction amount of a pressure distribution according to the multipole method immediately below the airframe in a case where the pair of shielding plates is not provided or a difference between a third-order pole distribution in a case where the pair of shielding plates is provided and a third-order pole distribution in a case where the pair of shielding plates is not provided as an index.

* * * * *